W. L. MORRIS.
COMBINED VALVE AND PIPE COUPLING.
APPLICATION FILED MAY 29, 1915.
1,172,298.
Patented Feb. 22, 1916.
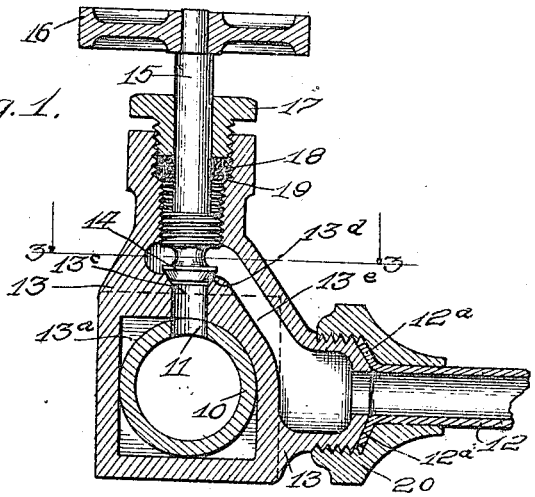
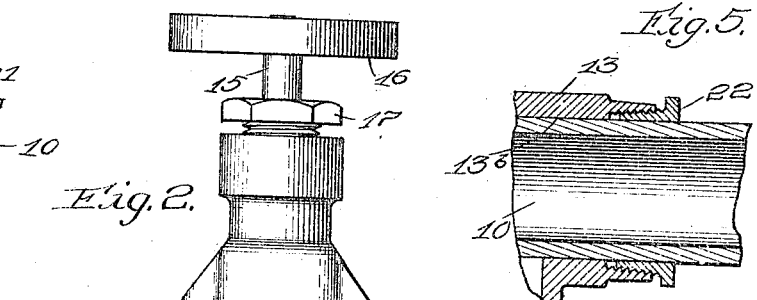
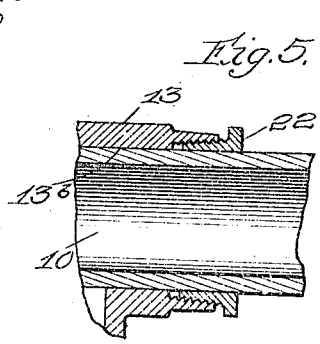
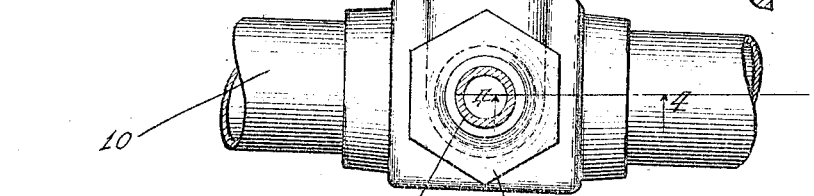
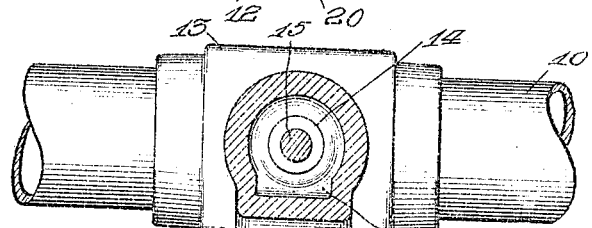
Witness:
Inventor
William L. Morris,
Attys.

UNITED STATES PATENT OFFICE.

WILLIAM L. MORRIS, OF FORT WAYNE, INDIANA, ASSIGNOR TO S. F. BOWSER & CO., INC., OF FORT WAYNE, INDIANA, A CORPORATION OF INDIANA.

COMBINED VALVE AND PIPE-COUPLING.

1,172,298.

Specification of Letters Patent.

Patented Feb. 22, 1916.

Original application filed January 16, 1912, Serial No. 677,995. Divided and this application filed May 29, 1915. Serial No. 31,092.

*To all whom it may concern:*

Be it known that I, WILLIAM L. MORRIS, a citizen of the United States, residing at Fort Wayne, in the county of Allen and State of Indiana, have invented certain new and useful Improvements in Combined Valves and Pipe-Couplings, of which the following is a specification.

The invention relates to a combined valve and pipe coupling adapted particularly for use in connecting a branch pipe with a main line pipe, and is shown in my application Serial No. 677,995, filed Jan. 16, 1912, of which application the present application is a division, as constituting a part of the connections used for supplying lubricating material to the bearings of an engine or similar machine.

The invention is particularly adapted for use in connecting branch lines of relatively thin copper or other ductile material, to main line pipes formed of the same material, and which piping is of such a character that it will not readily admit of threading connections thereinto, as, for example, copper tubing, which is very desirable for use in forming lubricating oil connections. It will be apparent, however, that the invention is applicable to any condition in which it is desired to connect branch pipes to main line pipes of the described character, and it is therefore not desired to be limited to use in engine oil connections or fitings.

In the drawings, constituting a part of this specification, Figure 1 is a cross-sectional view through a main line pipe to which is attached my combined valve and pipe coupling, the principal parts of the device being shown in section. Fig. 2 is a side elevation of the device of Fig. 1. Fig. 3 is a view in section through the casing on line 3—3 of Fig. 1, looking in the direction indicated by the arrows. Fig. 4 is a broken sectional view on line 4—4 of Fig. 2 showing the preferred construction of the casing of the coupling and means for attaching same to the main line pipe. Fig. 5 is a view similar to Fig. 4, showing a modification of the construction of the coupling and particularly the means for securing the same to the main line pipe.

A main line pipe ordinarily used as conduit for fluids such as lubricating oil, and the like, is indicated by the reference character 10. This pipe may be formed of copper or other suitable material, preferably of a ductile nature.

The reference character 11 designates an opening through the relatively thin walls of the pipe or tube 10, the material of which may not be of sufficient thickness to permit of the secure fastening of a connection thereto by threading the walls around the opening 11.

The reference character 12 designates a branch line tube or pipe which may also be formed of copper or other suitable ductile material, so that the walls of the tube will be relatively thin; and in order to form a fluid-tight connection between the interior of the tubing 12 and the interior of the main line pipe 10, and the vent or opening 11 therein, I provide the coupling casing indicated generally by the reference character 13. The casing 13 is preferably a casting of suitable metal which may be machined, and is provided on its interior with an opening $13^a$ preferably somewhat larger than the exterior diameter of the main line pipe 10 which it is adapted to surround in order to form a connection between the vent 11 of the main line pipe and the branch line 12. At each extremity of the casing 13 and the hollow interior $13^a$ thereof the walls of the casing 13 are slightly contracted, as indicated at $13^b$ (see Fig. 4). In order to attach the coupling to the main line pipe 10 after the vent or opening 11 is tapped therein, the casing 13 will be placed in position over the pipe 10 with the opening $13^c$ leading to the valve seat $13^d$ in position for ready communication with the opening 11 in pipe 10.

The reference character $13^e$ designates a branch chamber or opening in the casing 13 commuicating with the opening or passageway $13^c$, communication between the two latter interior portions of the fitting being under the control of the valve 14 carried at the lower extremity of valve stem 15 which latter has an enlarged threaded collar in engagement with a corresponding threaded portion of casing 13 at the upper extremity of the chamber or passage $13^e$, by which the rotation of valve stem 15, by means of a suitable hand wheel or other operating device 16 at the upper extremity thereof, will cause the valve 14 to engage the seat $13^d$, or to be lifted from the seat, thereby establishing or closing communication between chamber 13ᶜ and the opening 13ᵈ at will.

The reference character 17 designates a gland nut threaded into the walls of the upper extremity of the casing 13 and provided with an opening for the valve stem 15 whereby the operation of this nut will place any desired degree of pressure upon packing member 18 thereby forming a fluid-tight connection between the upper extremity of the casing and the valve stem 15. The packing 18 may be retained in position against downward thrust by means of a washer 19 shown in Fig. 1, or any other suitable means. The material of the casing 13 surrounding the outer extremity of the chamber 13ᵉ, is reduced in the form of a nipple and threaded exteriorly to take the interiorly threaded connecting nut or collar 20. This is a common connection or coupling and the outer extremity of the threaded collar or coupling 20 is reduced beyond the threaded portion to correspond with the exterior diameter of the copper tubing 12 the inner extremity of which is bell-mouthed as indicated at 12ᵃ, so that when the collar 20 is tightened upon the exteriorly threaded portion of the casing 13, the bell-mouthed portion 12ᵃ will be clamped tightly between the casing and the collar 20, and a fluid-tight joint or coupling formed between the parts. When the casing 13 has been placed in position over the main line pipe 10, with the passage 13ᶜ in communication with the vent 11, and the pipe 12 has been connected with the casing 13 by the tightening of the collar 20, the connection between the main line pipe 10 and the branch 12 will be complete and fluid-tight with the exception of the attachment of the walls of casing 13 around the main line pipe 10. A fluid-tight joint between the latter parts may be secured, as I have indicated in the sectional view in Fig. 4, by the introduction of soldering material, as indicated at 21, between the opposite extremities of the fitting 13 and the outer periphery of the pipe.

In forming the casing 13, the extremities thereof surrounding the pipe 10 beyond the more closely fitting shoulders 13ᵇ, may be slightly enlarged to permit of the entry of a considerable body of soldering material and thereby expedite the forming of a fluid-tight joint at the ends of the casing around the pipe 10.

In Fig. 5 I show another means of closing the extremities of the casing 13 around pipe 10, which consists in the use of the threaded collars 22 of wedge shape in cross section, and coöperating with the threaded interior extremities of casing 13, whereby the tightening of the collars 22 will exert a wedging action between the casing and the pipe, thereby rendering the interior 13ᵃ of the casing, liquid-tight with respect to the casing and pipe 10.

I claim:

1. A pipe fitting comprising a body having an integral pipe encircling sleeve and a passage extending through the body and communicating with the interior of the sleeve; a valve seat in said passage; a valve in the body coöperating with the valve seat; and means for sealing joints between the body and a pipe disposed in said sleeve.

2. A pipe fitting comprising a body having an integral pipe encircling sleeve and a passage extending through the body around the sleeve and communicating with the interior of the latter; and means for preventing the passage of liquid between said sleeve and a pipe disposed in said sleeve.

3. In combination, a pipe having a lateral opening therein; a fitting encircling said pipe and covering said opening, said fitting having a passage extending around and separated from the pipe with one end registering with the opening in the pipe and its other end opening radially and outwardly from the pipe; and means sealing the joint between said pipe and said fitting.

4. In combination, a pipe having an opening in its side; a fitting encircling the pipe and covering said opening, there being a passage through said fitting having one end registering with the opening in said pipe, extending radially a short distance from said opening then turning at a sharp angle and extending around the pipe for substantially 90° with its other end directed outwardly away from the pipe; a valve in said passage at the sharp angle thereof adapted to control the flow of fluid through the passage; and means sealing the joint between the pipe and fitting.

5. A pipe fitting comprising a body having an integral sleeve portion adapted to encircle a pipe, there being a passage leading from the interior of the sleeve through the body; and means for connecting a branch pipe to the body in communication with said passage.

In testimony whereof I have signed my name to this specification, in the presence of two subscribing witnesses, on this 27th day of May, A. D. 1915.

WILLIAM L. MORRIS.

Witnesses:
CHARLES H. SEEM,
ARTHUR L. SPRINKLE.